United States Patent
Masunishi et al.

(10) Patent No.: US 10,908,035 B2
(45) Date of Patent: Feb. 2, 2021

(54) PRESSURE SENSOR

(71) Applicant: KABUSHIKI KAISHA TOSHIBA, Tokyo (JP)

(72) Inventors: Kei Masunishi, Kawasaki Kanagawa (JP); Naofumi Nakamura, Tokyo (JP); Hiroaki Yamazaki, Yokohama Kanagawa (JP); Tomohiro Saito, Yokohama Kanagawa (JP); Fumitaka Ishibashi, Kawasaki Kanagawa (JP); Yoshihiko Kurui, Chigasaki Kanagawa (JP); Tomohiko Nagata, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/567,536

(22) Filed: Sep. 11, 2019

(65) Prior Publication Data

US 2020/0300717 A1    Sep. 24, 2020

(30) Foreign Application Priority Data

Mar. 19, 2019  (JP) ................ 2019-051692

(51) Int. Cl.
  *G01L 1/00*   (2006.01)
  *G01L 1/14*   (2006.01)

(52) U.S. Cl.
  CPC .............. *G01L 1/144* (2013.01); *G01L 1/148* (2013.01)

(58) Field of Classification Search
  CPC .................. G01L 1/144; G01L 1/148
  USPC .................................... 73/862.626
  See application file for complete search history.

(56) References Cited

U.S. PATENT DOCUMENTS

| 6,150,688 A * | 11/2000 | Maeda ............ H01L 21/84 257/302 |
| 6,407,393 B1 * | 6/2002 | Kim ............ H01L 27/14603 250/370.09 |
| 6,583,458 B1 * | 6/2003 | Hayashi ........... H01L 27/10894 257/296 |
| 8,957,466 B2 * | 2/2015 | Nakamura ........ H01L 27/10817 257/306 |
| 9,915,848 B2 * | 3/2018 | Kubota ............ H01L 27/1225 |
| 2004/0173874 A1 * | 9/2004 | Saigoh ............ H01L 27/11502 257/535 |
| 2007/0141800 A1 * | 6/2007 | Kurihara ............ H01L 24/16 438/396 |

(Continued)

FOREIGN PATENT DOCUMENTS

JP    2015-52532 A   3/2015
JP       6132047 B1   5/2017

*Primary Examiner* — Max H Noori
(74) *Attorney, Agent, or Firm* — Finnegan, Henderson, Farabow, Garrett & Dunner, L.L.P.

(57) ABSTRACT

According to one embodiment, a pressure sensor is disclosed. The pressure sensor includes a substrate, and a first capacitor element. The first capacitor element includes a lower electrode provided on the substrate, an upper electrode disposed above the lower electrode, and a film provided over the lower electrode and upper electrode. The lower electrode and the upper electrode are between the substrate and the film. An absolute value of an amount of change in an electrostatic capacitance between the lower electrode and the upper electrode with respect to unit change in an ambient temperature of the first capacitor element is substantially zero.

10 Claims, 11 Drawing Sheets (56) References Cited

U.S. PATENT DOCUMENTS

| | | |
|---|---|---|
| 2015/0068314 A1 | 3/2015 | Nakamura et al. |
| 2016/0187370 A1* | 6/2016 | Ikehashi ............... B81B 3/0086 73/514.32 |
| 2016/0274394 A1* | 9/2016 | Yamazaki ......... G02F 1/133514 |

* cited by examiner

PRESSURE SENSOR

CROSS-REFERENCE TO RELATED APPLICATIONS

This application is based upon and claims the benefit of priority from Japanese Patent Application No. 2019-051692, filed Mar. 19, 2019, the entire contents of which are incorporated herein by reference.

FIELD

Embodiments described herein relate generally to a pressure sensor.

BACKGROUND

There is a demand of improving performance of sensors.

DETAILED DESCRIPTION

In general, according to one embodiment, a pressure sensor is disclosed. The pressure sensor includes a substrate, and a first capacitor element. The first capacitor element includes a lower electrode provided on the substrate, an upper electrode disposed above the lower electrode, and a film provided over the lower electrode and upper electrode. The lower electrode and the upper electrode are between the substrate and the film. An absolute value of an amount of change in an electrostatic capacitance between the lower electrode and the upper electrode with respect to unit change in an ambient temperature of the first capacitor element is substantially zero.

Embodiments will be described hereinafter with reference to the accompanying drawings. The drawings are schematic or conceptual drawings, and dimensions and ratios are not necessarily the same as those in reality. Further, in the drawings, the same reference symbols (including those having different subscripts) denote the same or corresponding parts, and overlapping explanations thereof will be made as necessary. In addition, as used in the description and the appended claims, what is expressed by a singular form shall include the meaning of "more than one".

First Embodiment

Figure 1:
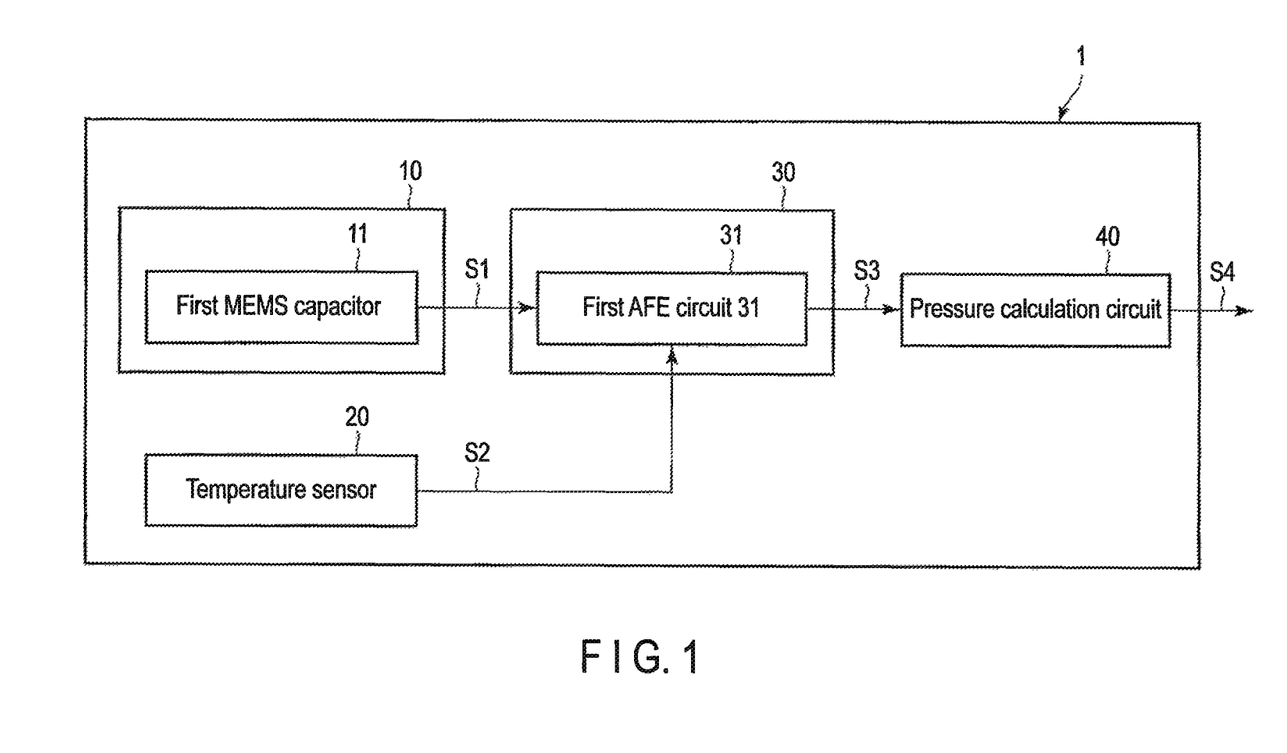
FIG. 1 is a block diagram showing a pressure sensor according to a first embodiment.

FIG. 1 is a block diagram showing a pressure sensor 1 according to the first embodiment.

The pressure sensor 1 includes a capacitor portion 10, a temperature sensor 20, an analog front end (AFE) circuit unit 30 and a pressure calculation circuit 40.

The capacitor portion 10 includes a first MEMS capacitor (a first capacitor element) 11. The first MEMS capacitor 11 changes its electrostatic capacitance according to change in an ambient pressure of the first MEMS capacitor 11. The capacitor portion 10 outputs an analog signal S1 corresponding to the electrostatic capacitance. Hereafter, the first MEMS capacitor 11 will be described further.

Figure 2:
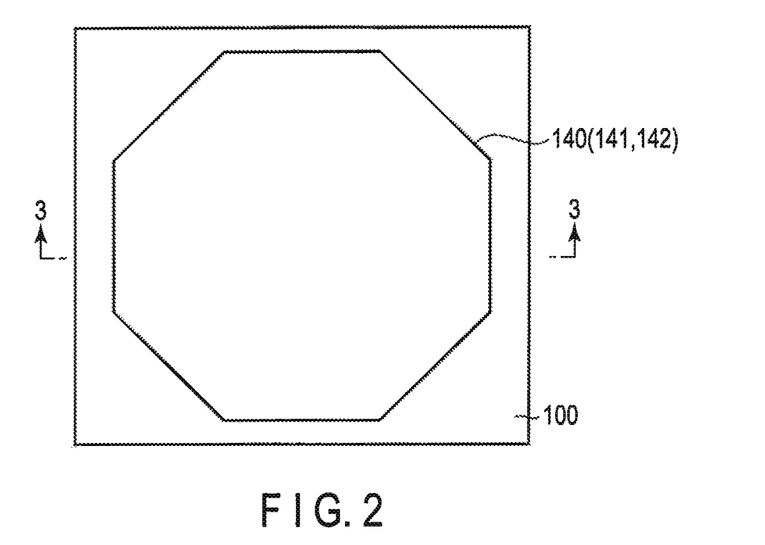
FIG. 2 is a plan view of a first MEMS capacitor of the pressure sensor according to the first embodiment.
Figure 3:
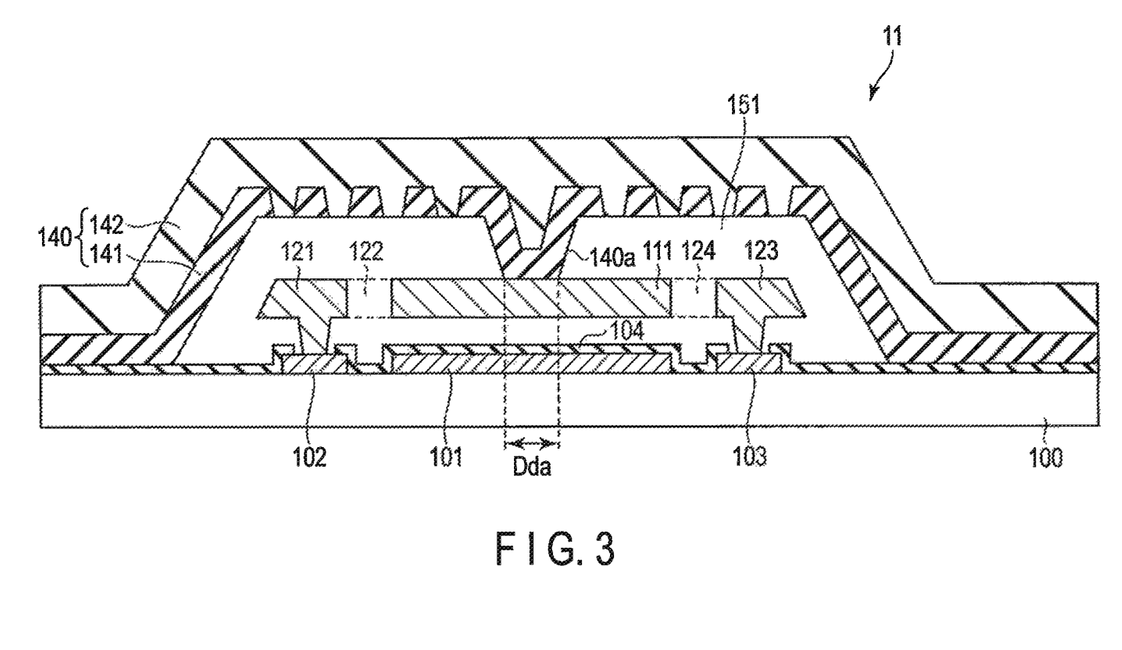
FIG. 3 is a cross section taken along line 3-3 in FIG. 2.

FIG. 2 is a plan view of the first MEMS capacitor 11, and FIG. 3 is a cross section taken along line 3-3 of FIG. 2.

The first MEMS capacitor 11 is provided on a substrate 100. A thickness of the substrate 100 is, for example, 250 [μm]. The first MEMS capacitor 11 includes a lower electrode 101, interconnects 102 and 103, an insulating film 104, an upper electrode 111, anchors 121 and 123, springs 122 and 124, and a diaphragm (film) 140.

The substrate 100 includes, for example, a silicon substrate (semiconductor substrate). The lower electrode 101 is provided on the substrate 100. The lower electrode 101 is fixed on the substrate 100. In the present embodiment, the lower electrode 101 has a flat plate shape. A material of the lower electrode 101 is, for example, an AlCu alloy. A thickness of the lower electrode 101 is, for example, several to several hundred micrometers.

In addition, interconnects 102 and 103, and an insulating film 104 are also provided on the substrate 100. The interconnect 102 is disposed such that there exists a gap between the interconnect 102 and an outer side of one end of the lower electrode 101. The interconnect 103 is disposed such that there exists a gap between the interconnect 103 and an outer side of the other end of the lower electrode 101.

The interconnects 102 and 103 are connected to the first AFE circuit unit 30 via an interconnect (not shown). The insulating film 104 is provided on the lower electrode 101, the interconnect 102 and the interconnect 103. The insulating film 103 includes a through-hole provided therein so as to expose a part of an upper surface of the interconnect 102 and a part of an upper surface of the interconnect 103.

The upper electrode 111 is provided above the lower electrode 101 via the insulating film 104. The upper electrode 111 is provided above the substrate 100 by using the anchor 121, the spring 122, the anchor 123 and the spring 124.

In the present specification, a lower surface of a member (for example, the interconnect 102) is a surface on a side opposing a referential member (for example, the substrate 100), and an upper surface of the member is a surface on an opposite side to the above-mentioned surface. Moreover, an upper direction of a member (for example, the lower electrode 101) is a direction from a lower surface of the member to an upper surface of the member when the member is spaced away from a referential member (for example, the substrate 100) and the lower surface of the member faces an upper surface of the referential member. Moreover, an lower direction of a member is a direction from the upper surface of the member to the lower surface of the member when the member is spaced away from the referential member and the upper surface of the member faces a lower surface of the referential member. Moreover, a top of a member (on a member) is referred as a position where another member is directly or indirectly in contact with an upper surface of the member. Moreover, a bottom of a member (under a member) is referred as a position where another member is directly or indirectly in contact with a lower surface of the member.

The anchor 121 is provided on the interconnect 102. The spring 122 is provided between the anchor 121 and the upper electrode ill. The anchor 121 is connected to one side of the upper electrode 111 via the spring 122.

The anchor 123 is provided on the interconnect 103. The spring 124 is provided between the anchor 123 and the upper electrode 111. The anchor 123 is connected to another side of the upper electrode 111 via the spring 124. The another side of the upper electrode 111 is on a side opposing to the one side.

In the present embodiment, the upper electrode 111 has a flat plate shape and is disposed so as to oppose the lower electrode 101. A material of the upper electrode 111 is, for example, an AlCu alloy.

A diaphragm (film) 140 of a multi-layered structure is provided on the substrate 100. The peripheral portion of the diaphragm 140 is in contact with the substrate 100 via the insulating film 104, and a central portion of the diaphragm 140 is spaced from the substrate 100. The diaphragm 140 includes an insulating film 142 and an insulating film 141 provided on the insulating film 142. Through-holes are provided in the insulating film 141, the through-holes are covered by the insulating film 142. The first MEMS capacitor 11 of the present embodiment is formed by using a sacrificial film process, and therefore the diaphragm 140 includes the insulating layer 141 and the insulating layer 142 (insulating films). The thickness of the insulating film 141 and the insulating film 142 is, for example, several hundred nanometers to several micrometers.

The lower electrode 101, the upper electrode 111, the anchor 121, the spring 122, the anchor 123 and the spring 124 are accommodated between the central portion of the diaphragm 140 and the substrate 100. The diaphragm 140 includes a projecting portion 140a (hereinafter referred as a diaphragm anchor) projecting to a substrate 100 side and connected to the upper electrode 111. There is a cavity 151 between the diaphragm 140 and the substrate 100. That is, between the central portion of the diaphragm 140 and the substrate 100, other than the lower electrode 101, the upper electrode 111, the anchor 121, the spring 122, the anchor 123 and the spring 124 is the cavity 151.

The diaphragm 140 deforms according to the change of pressure (environmental pressure). The spring 122 and the spring 124 are elastic members. Therefore, when the diaphragm 140 is deformed by pressure, the upper-electrode 111 moves up or down with reference to the lower electrode 101 according to the deformation of the diaphragm 140. As a result, the distance between the lower electrode and the upper electrode changes. As the pressure is higher, the gap between the upper electrode 111 and the lower electrode 101 becomes shorter, and the electrostatic capacitance between the upper electrode 111 and the lower electrode 101 becomes larger.

The temperature sensor 20 measures an ambient temperature of the first MEMS capacitor 11. The ambient temperature of the MEMS capacitor 11 is the temperature of a region within a predetermined distance from the MEMS capacitor 11, and a difference of which from the temperature of the MEMS capacitor 11 falls within a predetermined temperature range. The predetermined distance and predetermined temperature range depend on the specification (for example, capacity sensitivity) required for the pressure sensor 1, and generally, the higher the required specification for the pressure sensor 1, the less the predetermined distance and the predetermined temperature range. The temperature sensor 20 is formed on, for example, the substrate 100 on which the first MEMS capacitor 11 is formed, and thus the temperature sensor 20 is close or adjacent to the first MEMS capacitor 11. Similarly, the ambient pressure of the MEMS capacitor 11 is the pressure of a region within a predetermined distance from the MEMS capacitor 11, a difference of which from the pressure applied on the MEMS capacitor 11 falls within a predetermined pressure range. The predetermined distance and the predetermined pressure depend on the specification required for the pressure sensor 1, and generally, the higher the specification required for the pressure sensor 1, the less the predetermined distance and the predetermined pressure.

The temperature sensor 20 employs, for example, a temperature measuring resistor. The temperature sensor 20 outputs an analog signal S2 corresponding to the measured temperature (FIG. 1). The electrostatic capacitance between the upper electrode 111 and the lower electrode 101 has a temperature dependence. The analog signal S2 is used to correct a pressure error caused by the temperature dependency.

The AFE circuit unit 30 includes a first AFE circuit 31 (FIG. 1). The first AFE circuit 31 is an analog circuit portion preceding an A/D conversion and includes parts such as an amplifier and a filter. An analog signal S1 and an analog signal S2 are input to the first AFE circuit 31.

The analog signals S1 and S2 are weak and include a noise component in many cases, and thus it is difficult to convert the analog signal S1 and S2 into digital signals. For that reason, the first AFE circuit 31 carries out processes such as amplifying the levels of the analog signals S1 and S2 and regulating the waveforms of the analog signals S1 and S2. That is, the first AFE circuit 31 processes the analog signal S1 and S2 such that the analog signal S1 and S2 can be easily A/D converted. The first AFE circuit 31 outputs an analog signal S3.

The analog signal S3 is input to the pressure calculation circuit 40. The pressure calculation circuit 40 calculates the pressure based on the analog signal S3, and outputs a digital signal S4 corresponding to the pressure. The digital signal S4 is input to, for example, other circuits (not shown) in the pressure sensor 1, or other circuits outside the pressure sensor 1, or other devices (apparatuses) separated from the pressure sensor 1.

As set out above, the electrostatic capacitance between the upper electrode 111 and the lower electrode 101 has the temperature dependence. Here, if the electrostatic capacitance is represented by C, the ambient temperature of the first MEMS capacitor 11 is represented by T, and the ambient pressure of the first MEMS capacitor 11 is represented by P, the following formula (1) can be established.

$$dP/dT = dP/dC \times dC/dT \qquad (1)$$

dP/dT is a temperature differentiation of pressure, dP/dC is a capacitance differentiation of pressure, and dC/dT is a temperature differentiation of capacitance.

For example, when dP/dC is 1/73.0 [Pa/aF] and dC/dT is 26.7 [fF/K], dP/dT is 366 [Pa/K]. That is, when the temperature changes by 1 [° C.], the pressure changes by 366 [Pa].

In the example described above, in order to realize the pressure resolution of the pressure sensor 1 of 6.67 [Pa], it is necessary to perform the measurement of temperature on the order of 0.01 [° C.]. To achieve this, the first AFE circuit 31 needs to process the analog signal S2 on the order of 0.01 [° C.]. For carrying out such processing, a component such as an amplifier and a filter or the like that use a number of elements, and thus the first AFE circuit 31 (of the AFE circuit unit 30) is enlarged in size.

Thus, in the present embodiment, the diaphragm anchor 140a is improved based on the following considerations to suppress an enlargement of the AFE circuit 31.

Figure 4:
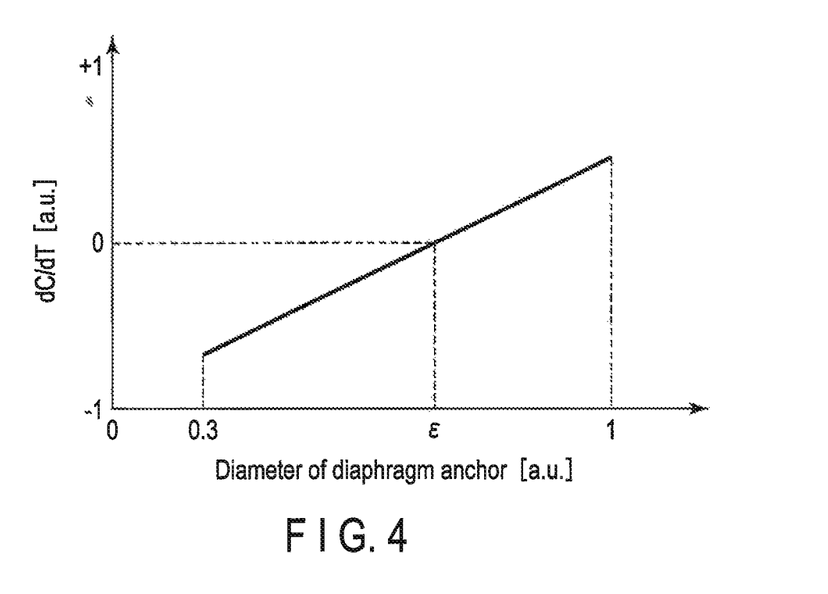
FIG. 4 is a graph schematically showing a relationship between a diameter of a diaphragm anchor and dC/dT.

FIG. 4 is a graph schematically showing the relationship between the diameter of the diaphragm anchor 140a (hereinafter referred to as an anchor diameter) and dC/dT.

The anchor diameter is a dimension which defines the size of the area of the contact surface between the diaphragm anchor 140 and the upper electrode 111. When the shape of the contact surface is a circle, the diameter of the circle is the anchor diameter.

As shown in FIG. 4, there is an anchor diameter (ε) at which dC/dT becomes zero. That is, when the anchor diameter falling within a predetermined range is used, the absolute value (|ΔC|) of an amount of change in the electrostatic capacitance C with respect to unit change in the ambient temperature can be substantially zero (for example, 100 [aF/K] or lower).

Moreover, when the absolute value |ΔC| is substantially zero, dP/dT is substantially zero, from the formula (1). In this manner, even if the resolution of the pressure of the pressure sensor 1 is set to 6.67 [Pa], the measurement of the temperature may be carried out on the order of 1 [° C.], and thus the enlargement of the first AFE circuit 31 is suppressed.

According to the present embodiment, when the anchor diameter falling within the predetermined range is used, |ΔC| (temperature sensitivity (dC/dT)), which is the absolute value of the amount of change in the electrostatic capacitance C to the unit change in the temperature T, can be sufficiently reduced. When the absolute value |ΔC| (temperature sensitivity (dC/dT)) is, for example, 1 [fF/K] or lower, the pressure sensitivity (dP/dT) can be reduced down to, for example, 13.7 [Pa/K], which is a small value. As a result, the enlargement of the first AFE circuit 31 can be suppressed. Thus, according to the present embodiment, the performance of the pressure sensor 1 can be improved.

Note that in the present embodiment, one first MEMS capacitor 11 is used, but a plurality of first MEMS capacitors 11 may be used. Generally, as the number of first MEMS capacitors 11 increases, the detection of change in the electrostatic capacitance can be performed at a lower pressure, and thus raising the pressure sensitivity (dC/dP).

Second Embodiment

As described in the first embodiment, when the anchor diameter falling within the predetermined range is used, |ΔC| (temperature sensitivity (dC/dP)), which is the absolute value of the amount of change in the electrostatic capacitance C to the unit change in the temperature T, can be sufficiently reduced. In the present embodiment, a pressure sensor will be described, which can reduce the capacitance error due to the temperature sensitivity (dC/dT) even if the anchor diameter changes and shifts from a designed value by variation in the manufacturing process.

Figure 5:
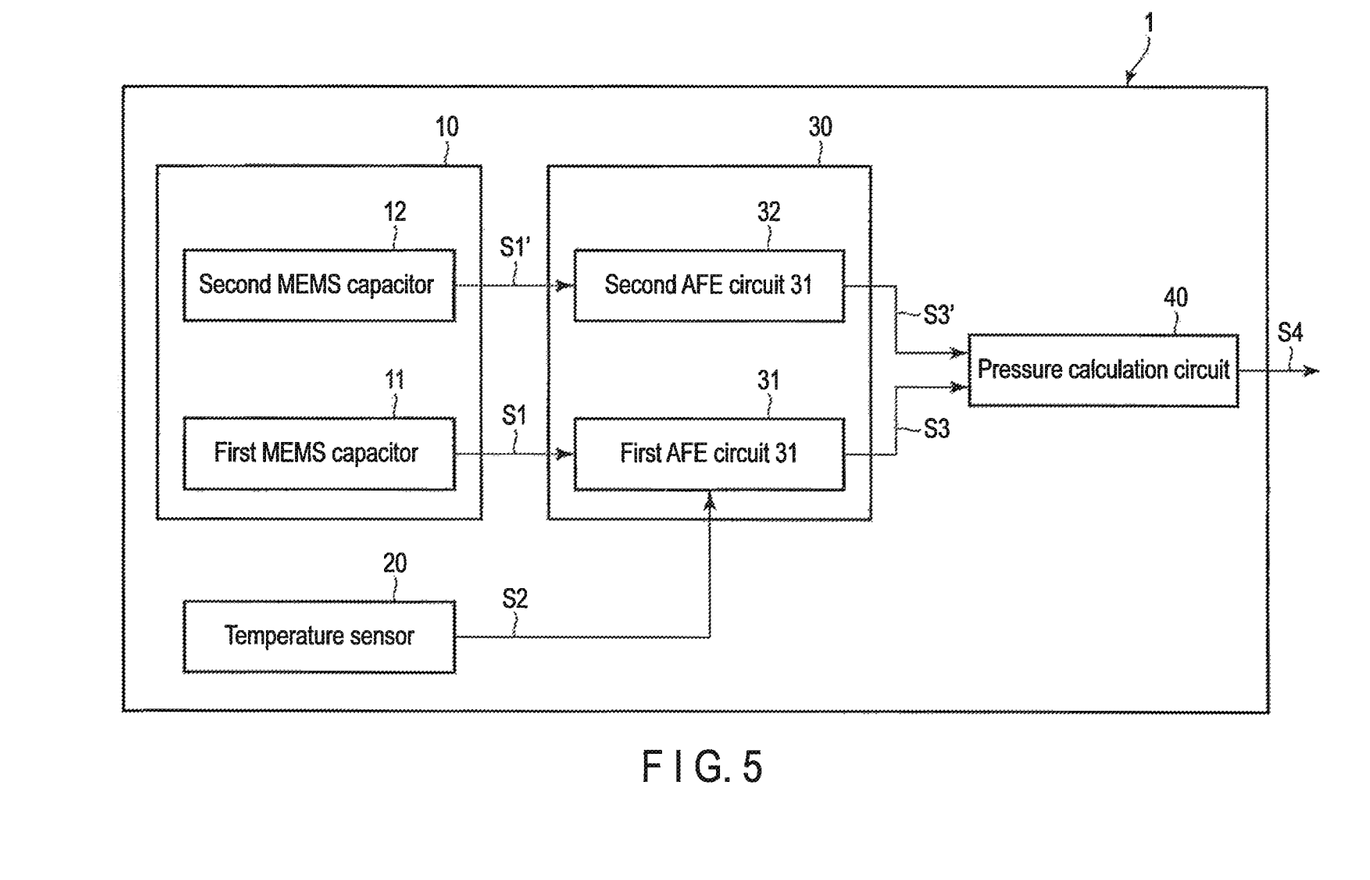
FIG. 5 is a block diagram showing a pressure sensor according to the second embodiment.

FIG. 5 is a block diagram showing a pressure sensor 1 according to the second embodiment.

The pressure sensor 1 includes a capacitor portion 10, a temperature sensor 20, an AFE circuit unit 30 and a pressure calculation circuit 40.

The capacitor portion 10 includes a first MEMS capacitor 11 and a second MEMS capacitor (second capacitor element) 12.

The first MEMS capacitor 11 of the present embodiment is the same as the first MEMS capacitor 11 of the first embodiment which is a pressure-detection capacitor element used co detect pressure and has a pressure sensitivity (dC/dP) equal to or higher than a predetermined value. As in the case of the first embodiment, the first MEMS capacitor 11 outputs an analog signal S1. However, when the anchor diameter shifts from an optimum value, the analog signal S1 contains a capacitance error due to a temperature sensitivity (dC/dT).

The second MEMS capacitor 12 is a referential capacitor element used to correct the capacitance error due to the temperature sensitivity (dC/dT). Therefore, the second MEMS capacitor 12 has a pressure sensitivity (dC/dP) that is lower than a pressure sensitivity (dC/dP) of the first MEM capacitor 11. The second MEMS capacitor 12 has a temperature sensitivity (dC/dT) equal to or substantially equal to that of the first MEMS capacitor 11, or a ration of the temperature sensitivity (dC/dT) of the first MEMS capacitor 11 to the temperature sensitivity (dC/dT) of second MEMS capacitor 12 is always constant. The second MEMS capacitor 12 outputs an analog signal S1', which corresponds to the electrostatic capacitance of the second MEMS capacitor 12.

When there is not capacitance error due to the temperature sensitivity (dC/dT), the analog signal S1 is the same or substantially the same as the analog signal S1'. Therefore, the difference between the analog signal S1 and the analog signal S1' can be used as correction data for correcting the capacitance error.

The AFE circuit unit 30 includes the first AFE circuit 31 and the second AFE circuit 32. As in the first embodiment, the analog signals S1 and S2 are input to the first AFE circuit 31, and an analog signal S3 is output from the first AFE circuit 31. On the other hand, the analog signal S1' is input to the second AFE circuit 32 and an analog signal S3' is output from the second AFE circuit 32.

The analog signals S3 and S3' are input to the pressure calculation circuit 40. The pressure calculation circuit 40 calculates the pressure based on the analog signal S3. In addition, the pressure calculation circuit 40 corrects the calculated pressure based on the difference between the analog signal S3 and the analog signal S3', that is, the correction data corresponding to the difference between the analog signal S1 and the analog signal S1'. Then, the pressure calculation circuit 40 outputs a digital signal S4 corresponding to the corrected pressure.

Figure 6:
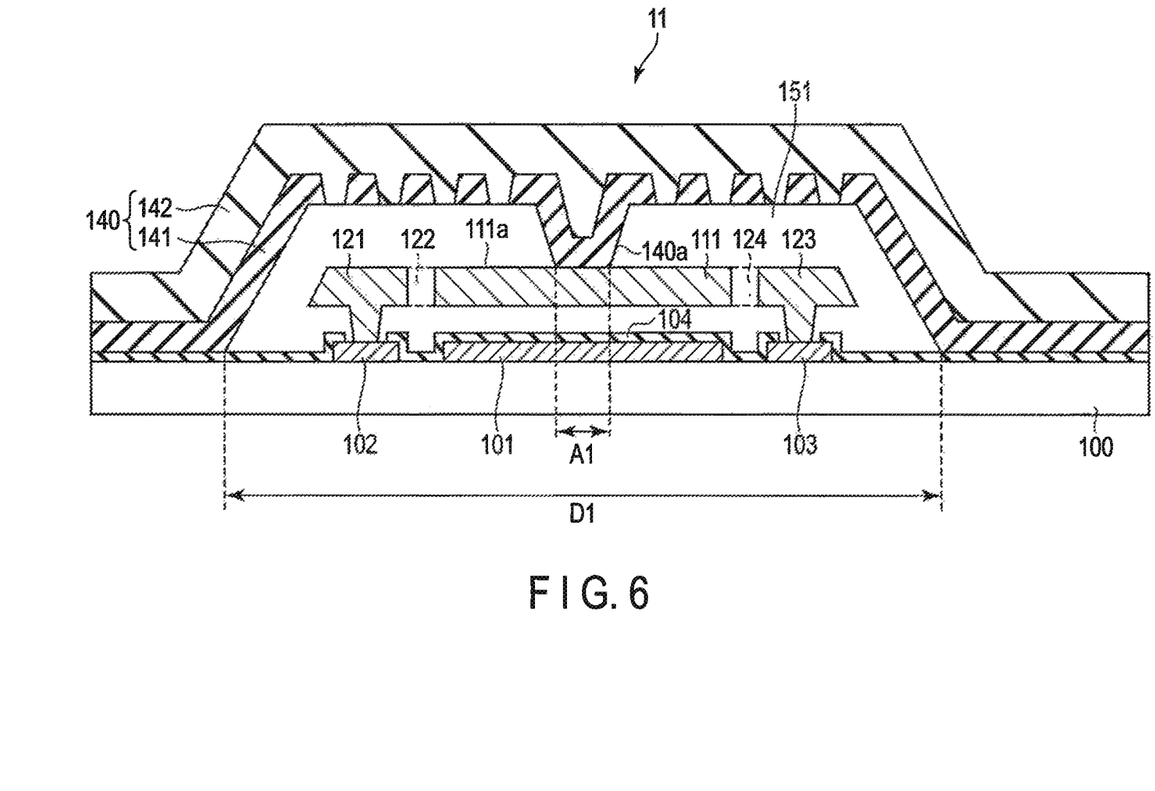
FIG. 6 is a cross section of a first MEMS capacitor of the pressure sensor according to the second embodiment.
Figure 7:
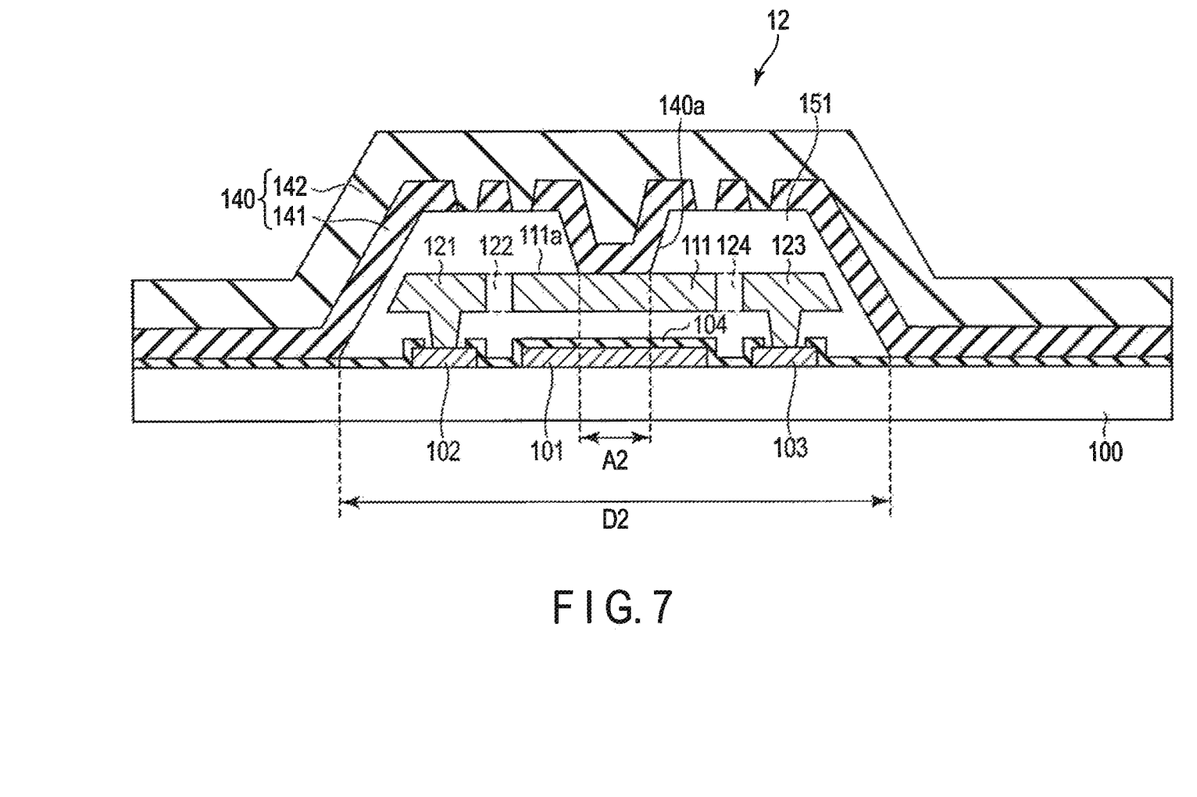
FIG. 7 is a cross section of a second MEMS capacitor of the pressure sensor according to the second embodiment.

FIG. 6 is a cross section of the first MEMS capacitor 11, and FIG. 7 is a cross section of the second MEMS capacitor 12.

In FIG. 6, a referential mark D1 denotes the diameter of the diaphragm 140 of the first MEMS capacitor 11 (hereinafter referred to as dome diameter). The dome diameter D1 is a diameter of the closed curve that is defined by a contact between the diaphragm 140 and its underlying layer (the insulating film 104 in the present embodiment). For example, when the closed curve is a circle, the diameter of the circle is the dome diameter D1. Alternatively, when the closed curve is a regular octagon, the distance between two opposing sides of the regular octagon is the dome diameter D1. Similarly, in FIG. 7, a referential mark D2 denotes the dome diameter of the second MEMS capacitor 12.

In the present embodiment, D1>D2 is established. The reason why will be described with reference to FIG. 8.

Figure 8:
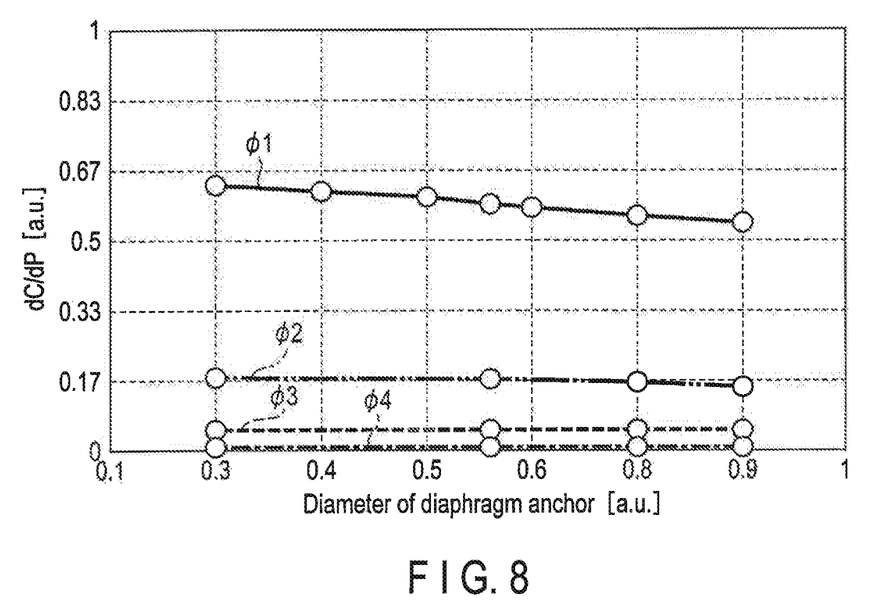
FIG. 8 is a graph schematically showing a relationship between a diameter of a diaphragm anchor and a pressure sensitivity (dC/dP).

FIG. 8 is a graph schematically showing the relationship between the dome diameter ($\phi1>\phi2>\phi3>\phi4$), the diameter of the diaphragm anchor (hereinafter referred to as anchor diameter), and the pressure sensitivity (dC/dP).

As shown in FIG. 8, as the dome diameter is less, the pressure sensitivity (dC/dP) is lower. Therefore, when the dome diameter D2 is set less than the dome diameter D1, it is possible to realize the second MEMS capacitor 12 of which pressure sensitivity (dC/dP) is lower than that of the first MEMS capacitor 11. Further, when the dome diameter D2 is set to a predetermined value or less, it is possible to realize the second MEMS capacitor 12 of which pressure sensitivity (dC/dP) is a predetermined value or lower. Moreover, as the dome diameter is less, the dependency of the anchor diameter on the pressure sensitivity (dC/dP) is lower.

Thus, as shown in FIGS. 6 and 7, the dome diameter D2 is set less than the dome diameter D1 in the present embodiment. In this case, as viewed from above the substrate 100, the area of the diaphragm 140 of the second MEMS capacitor 12 having the dome diameter D2 is smaller than the area of the diaphragm 140 of the first MEMS capacitor 11 having the dome diameter D1.

Here, in FIG. 6, a referential mark A1 denotes the anchor diameter of the first MEMS capacitor 11, and in FIG. 7, a referential mark A2 denotes the anchor diameter of the second MEMS capacitor 12.

Figure 9:
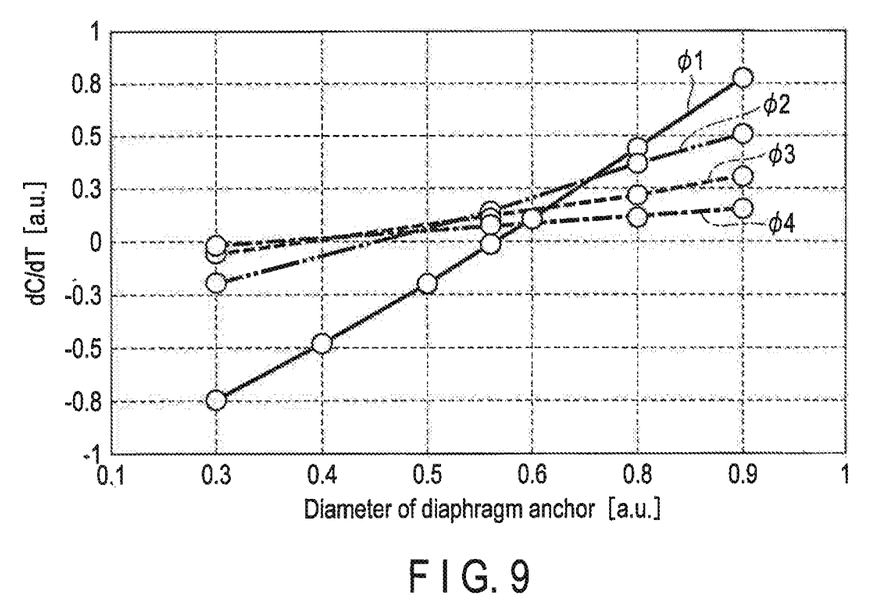
FIG. 9 is a graph schematically showing a relationship between a diameter of a dome of a diaphragm, a diameter of the diaphragm anchor, and a temperature sensitivity (dC/dT).

FIG. 9 is a graph schematically showing the relationship between the dome diameter ($\phi1>\phi2>\phi3>\phi4$), the anchor diameter, and the temperature sensitivity (dC/dT).

As shown in FIG. 9, regardless of the dome diameter, there is an anchor diameter at which the temperature sensitivity (dC/dT) is near zero, and as a result, it is possible to realize a second MEMS capacitor 12 having a temperature sensitivity (dC/dT) equal to or substantially equal to that of the first MEMS capacitor 11, or a temperature sensitivity (dC/dT) of which ratio with respect to that of the first MEMS capacitor 11 is always constant.

Note that the first MEMS capacitor 11 and the second MEMS capacitor 12 are formed to be close to each other in the same wafer, and therefore the variation in the processing of the first MEMS capacitor 11 and the Second MEMS capacitor 12 is small.

Figure 10A:
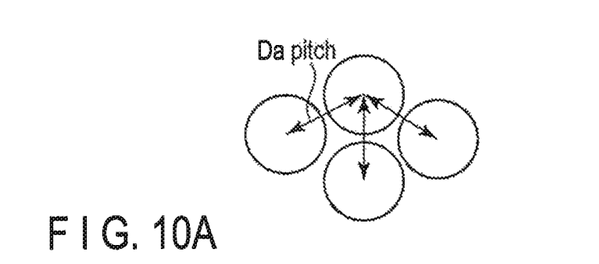
FIGS. 10A, 10B and 10C are plan views illustrating a modified example of the diaphragm anchor of the second embodiment.
Figure 10B:
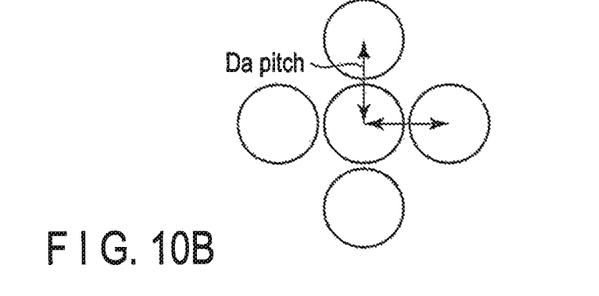
Figure 10C:
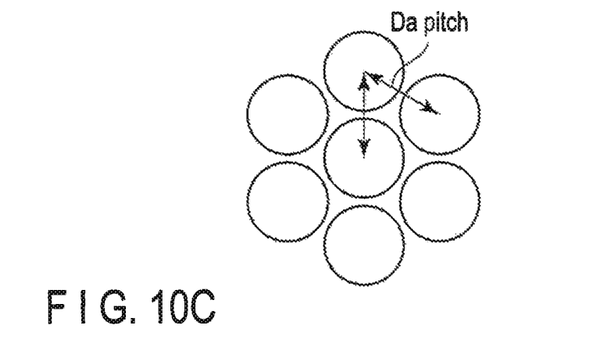
Figure 11A:
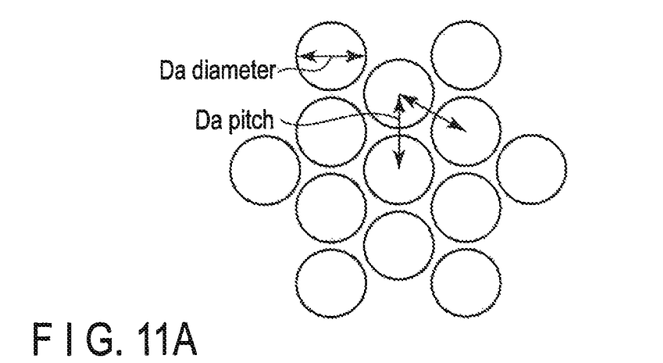
FIGS. 11A, 11B and 11C are plan views illustrating another modified example of the diaphragm anchor of the second embodiment.
Figure 11B:
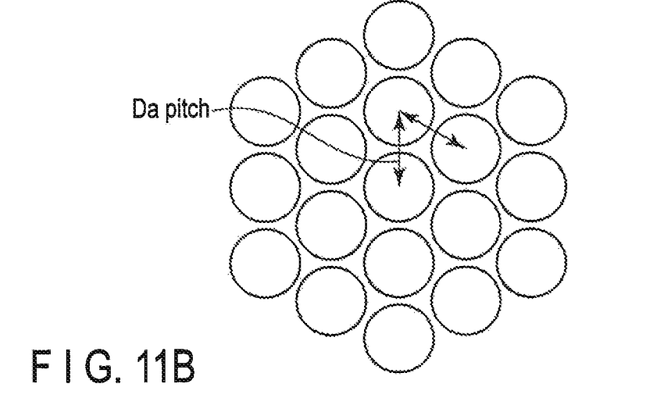
Figure 11C:
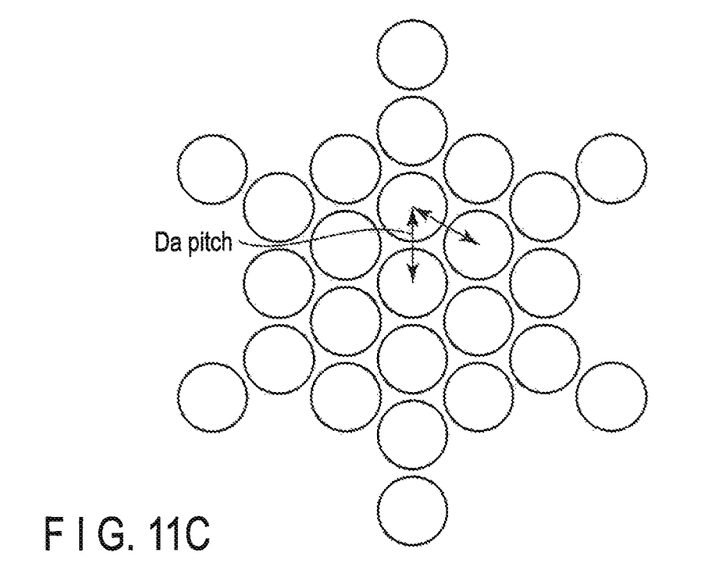
Figure 12A:
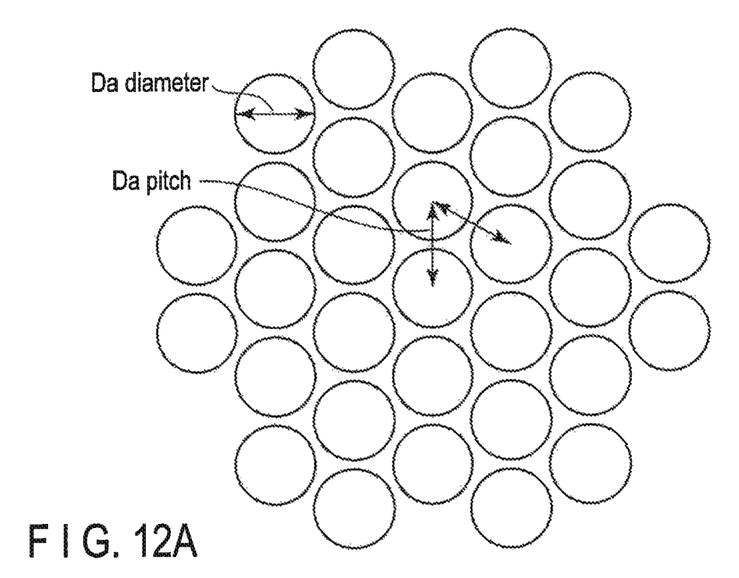
FIGS. 12A and 12B are plan views illustrating yet another modified example of the diaphragm anchor of the second embodiment.
Figure 12B:
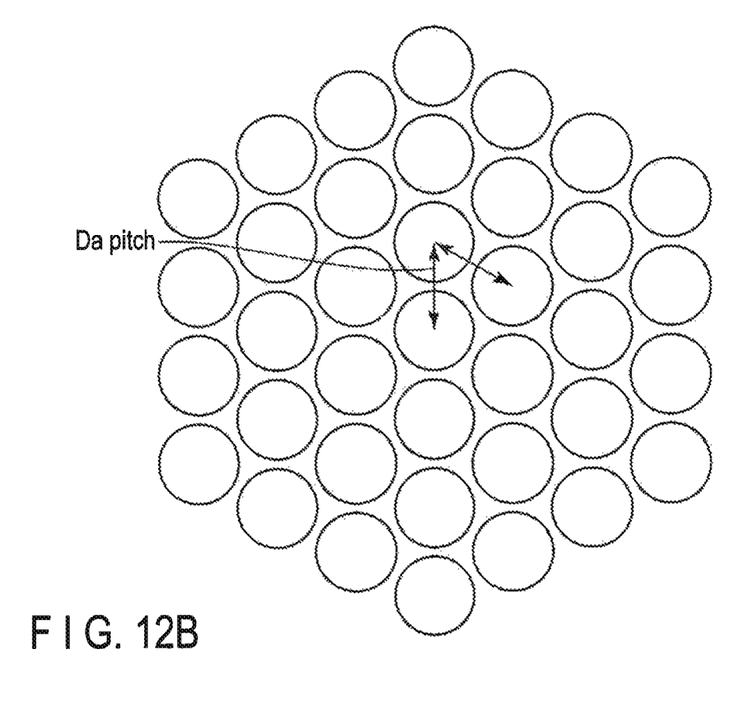

FIGS. 10 to 12 are plan views illustrating modified examples of the diaphragm anchor 140a of the present embodiment, and showing plane patterns when viewing the diaphragm anchor 140a from an upper electrode 111 side.

In the present embodiment, in both the first MEMS capacitor 11 and the second MEMS capacitor 12, the number of diaphragm anchors 140a (the number of diaphragm anchors) is 1, but in at least one of the first MEMS capacitor 11 and the second MEMS capacitor 12, the number of diaphragm anchors may be two or more as shown in FIGS. 10 to 12. In other words, diaphragm anchors may be divided.

FIG. 10A shows a plane pattern in which the number of diaphragm anchors is 4 and the number of annular ring s is 2*. The mark * indicates that a diaphragm anchor is disposed on a part of the outermost annular ring. FIG. 11A shows the case where three diaphragm anchors are disposed on the outermost annular ring. FIG. 10B shows a plane pattern in which the number of diaphragm anchors is 5 and the number of annular rings is 2. FIG. 10C shows a plane pattern in which the number of diaphragm anchors is 7 and the number of annular rings is 2. The diaphragm anchors shown in FIGS. 10A to 10C have line symmetry.

FIG. 11A shows a plane pattern in which the number of diaphragm anchors is 13 and the number of annular rings is 3*. FIG. 11B shows a plane pattern in which the number of diaphragm anchors is 19 and the number of annular rings is 3. FIG. 11C shows a plane pattern in which the number of diaphragm anchors is 25 and the number of annular rings is 4*.

FIG. 12A shows a plane pattern in which the number of diaphragm anchors is 31 and the number of annular rings is 4*. FIG. 12B shows a plane pattern in which the number of diaphragm anchors is 37 and the number of annular rings is 4.

Figure 13:
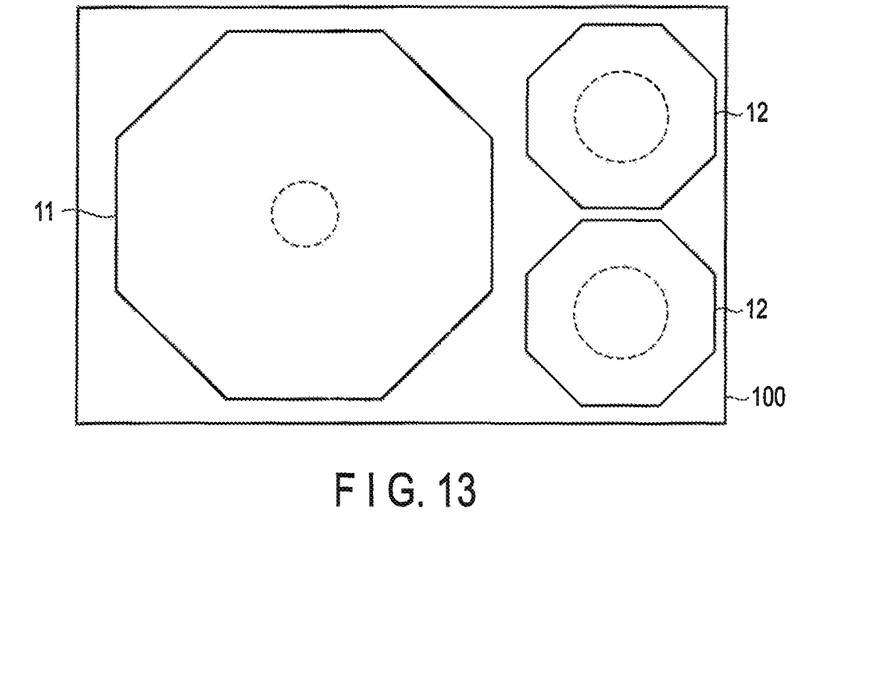
FIG. 13 is a plan view illustrating a modified example of the capacitor portion of the second embodiment.

FIG. 13 is a plan view illustrating another modified example of the capacitor portion 10 of the present embodiment.

In the present embodiment, the number of the first MEMS capacitors 11 of the capacitor portion 10 is 1, but the number may be two or more. The first MEMS capacitors 11 are electrically connected in parallel.

Moreover, the number of the first MEMS capacitors 11 of the capacitor portion 10 of the present embodiment is two or more, and a plurality of second MEMS capacitors 12 may be provided for each of the first MEMS capacitors 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pressure sensor comprising:
   a substrate; and
   a first capacitor element,
   the first capacitor element comprising:
   a lower electrode provided on the substrate,
   an upper electrode disposed above the lower electrode, and
   an insulating film that comprises an insulating projection portion and is provided over the lower electrode and upper electrode, wherein the lower electrode and the upper electrode are between the substrate and the insulating film, and the insulating projection portion is in contact with the upper electrode,
   an absolute value of an amount of change in an electrostatic capacitance between the lower electrode and the upper electrode with respect to unit change in an ambient temperature of the first capacitor element being substantially zero.

2. The pressure sensor of claim 1, wherein the substrate and the insulating film are configured to encompass the lower electrode and the upper electrode.

3. The pressure sensor of claim 1, further comprising:
   a first analog front end (AFE) circuit connected to the first capacitor element; and
   a pressure calculation circuit connected to the first AFE circuit.

4. The pressure sensor of claim 1, wherein:
   the lower electrode is fixed on the substrate;

the insulating film deforms according to change in pressure; and the upper electrode is movable upward or downward with reference to the lower electrode according to deformation of the film.

5. A pressure sensor comprising:
a substrate;
a first capacitor element; and
a second capacitor element,
each of the first capacitor element and the second capacitor element comprising:
a lower electrode provided on the substrate,
an upper electrode disposed above the lower electrode, and
an insulating film that comprises an insulating projection portion and is provided over the lower electrode and the upper electrode, wherein the lower electrode and the upper electrode are between the substrate and the insulating film, and the insulating projection portion is in contact with the upper electrode,
an absolute value of an amount of change in a first electrostatic capacitance between the lower and upper electrodes of the first capacitor element with respect to unit change in an ambient pressure of the first capacitor element being greater than an absolute value of an amount of change in a second electrostatic capacitance between the lower and upper electrodes of the second capacitor element with respect to unit change in an ambient pressure of the second capacitor element, and
an absolute value of a first amount of change in the first electrostatic capacitance with respect to unit change in an ambient temperature of the first capacitor element is substantially equal to an absolute value of a second amount of change in the second electrostatic capacitance with respect to unit change in an ambient temperature of the second capacitor element, or a ratio of the first amount with respect to the second amount is constant.

6. The pressure sensor of claim 5, wherein the substrate and the insulating film are configured to encompass the lower electrode and the upper electrode.

7. The pressure sensor of claim 5, wherein an area of the insulating film of the second capacitor element is less than an area of the insulating film of the first capacitor element as viewed from above the substrate.

8. The pressure sensor of claim 5, further comprising:
a first AFE circuit connected to the first capacitor element;
a second AFE circuit connected to the second capacitor element; and
a pressure calculation circuit connected to the first AFE circuit and the second AFE circuit.

9. The pressure sensor of claim 5, wherein
in each of the first capacitor element and the second capacitor element,
the lower electrode is fixed on the substrate,
the insulating film deforms according to change in pressure, and
the upper electrode is movable upward or downward according to deformation of the film.

10. The pressure sensor of claim 1, wherein
the insulating projection portion has a diameter such that the absolute value of the amount of change in the electrostatic capacitance between the lower electrode and the upper electrode with respect to the unit change in the ambient temperature of the first capacitor element is substantially zero.

* * * * *